UNITED STATES PATENT OFFICE.

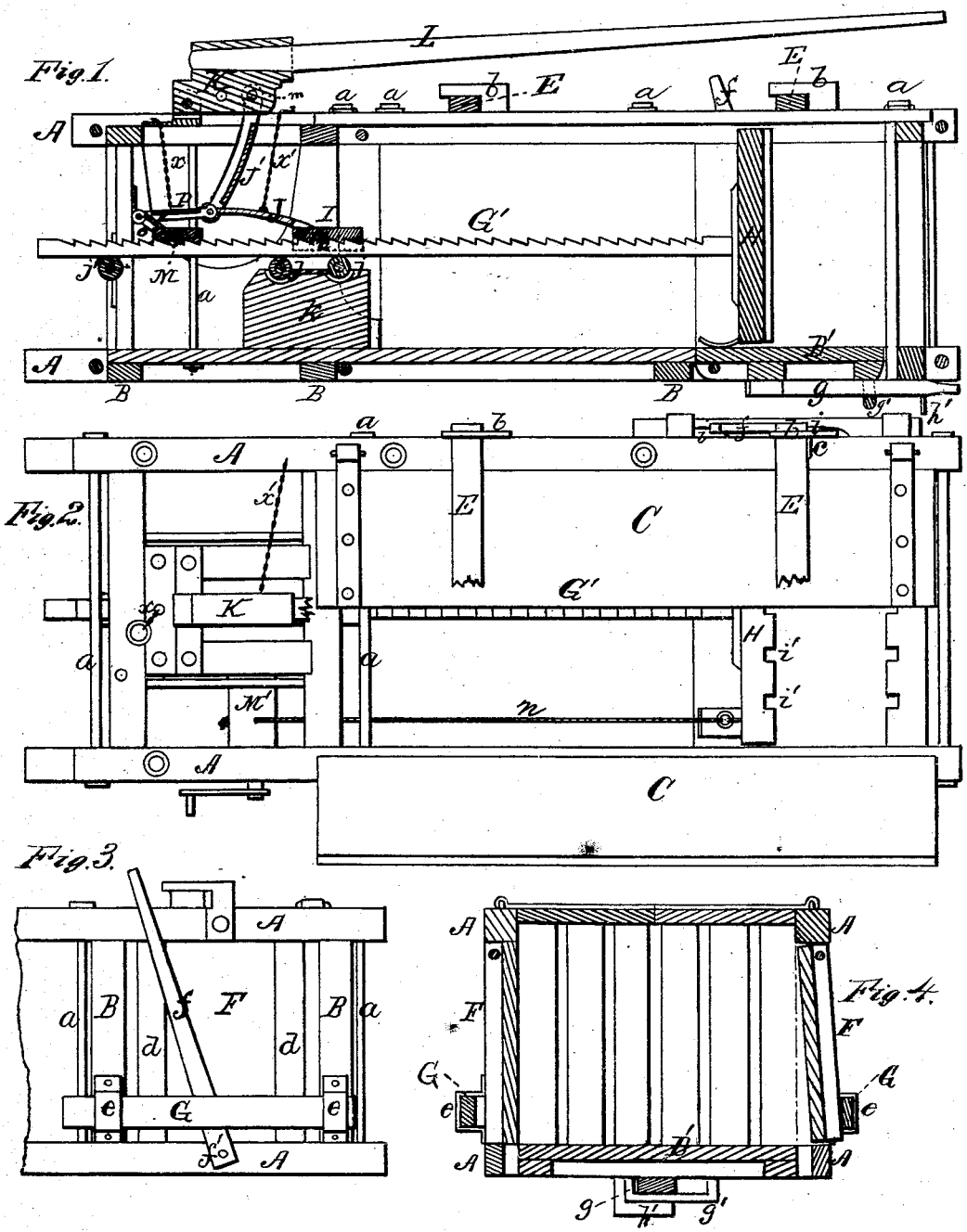

THOMAS B. BENNETT AND EDWIN J. RANCIER, OF BELTON, TEXAS.

IMPROVEMENT IN HORIZONTAL HAY AND COTTON PRESSES.

Specification forming part of Letters Patent No. 160,143, dated February 23, 1875; application filed November 28, 1874.

*To all whom it may concern:*

Be it known that we, THOMAS B. BENNETT and EDWARD J. RANCIER, of Belton, in the county of Bell and State of Texas, have invented a new and valuable Improvement in Portable Horizontal Hand-Presses; and we do hereby declare that the following is a full, clear, and exact description of the construction and operation of the same, reference being had to the annexed drawings, making a part of this specification, and to the letters and figures of reference marked thereon.

Figure 1 of the drawing is a representation of a longitudinal vertical section of our press. Fig. 2 is a plan view of the same, and Fig. 3 is a detail view. Fig. 4 is a transverse sectional view.

This invention has relation to hay, cotton, and other presses, of the horizontal kind, which are adapted to be mounted upon a wagon-bed and transported, as may be desired, from place to place; and the nature of the invention consists in combining with vertically-vibrating hinged doors, and with hooks rigidly secured to the upper part of the press-box, detachable bars, having hooks upon their ends, which bars, when engaged under the hooks, and across the hinged doors, the same being closed, effectually prevent upward displacement thereof during the formation of a bale, and at the same time brace the sides of the press-box against outward displacement. It also consists in combining with side doors at the rear end of the press-box, which are hinged to vibrate outwardly and upwardly, movable horizontal bars, guided in staples rigidly secured to the vertical sides of the said box, the said bars having upon their inner surfaces notches with inclined faces, which notches are adapted to receive the vertically-arranged brace-bars of the said doors, and to allow them, when thus engaged, to swing outwardly, whereby a completed bale is relieved from the pressure of the said doors, and is allowed to fall through a trap-door in the bottom of the press-box. It also consists in a horizontally-vibrating catch-lever, pivoted to the said trap-door, which, when engaged with a hook depending from the rear end of the press-box, will rigidly hold the said door closed, and when disengaged therefrom, will allow the door to fall, and the bale to fall to the ground.

In the annexed drawings, A designates the main beams of our improved baling-press, rigidly braced by iron tie-rods $a$ and transverse beams B. The central part of the vertical sides of the press-frame is closed, and the upper rear part or press-box is provided with doors C, hinged to vibrate outwardly, as shown in Fig. 2, whereby the said doors not only serve to prevent the escape of cotton from the press-box during compression, but when open serve as a hopper, whereby the operator is able to heap up the cotton, and, when tramping it down preparatory to actuating the follower, to introduce a large quantity of cotton into the press-box before such actuation. When these doors are closed, and a bale is in process of formation, they are prevented from upward displacement by means of rectangular bars E, applied across the said frame above the doors, the ends of which engage with hooks $b$ of sufficient strength, rigidly secured in any suitable manner to the upper beams A of the press-frame. These bars are provided as to their ends with L-shaped metallic plates $c$, the short arm of which is at right angles to the length thereof, and which hook over the edge of the hooks $b$, as shown in Fig. 2.

By this means the bars E serve a double purpose. Not only do they prevent the doors C from upward displacement, but by means of the plates $c$ upon their ends they also brace the sides of the press-box against lateral displacement.

F designates doors at the sides of the press-box and at the rear portion thereof, which are hinged at their upper part to vibrate vertically and upwardly, and are provided with vertical brace-bars $d$; and $e$ designate staples, preferably of flat metal, which are rigidly secured to the transverse beams B, between which the said doors are situated. G designates a horizontal bar, which is passed through the staples $e$, and has an endwise movement therein, the inner surfaces of which are provided with notches $i$, having inclined ends. This endwise-movable bar is actuated by means of a lever, $f$, having its fulcrum at $f'$, which passes through a slot in the said bar, and extends upward beyond the horizontal upper surface of the press-box. The lever $f$ being in the position shown in Fig. 3, the doors C are held in the same vertical plane with the sides of the press-box; but if it be thrust in the opposite direction to that there shown, the vertical bars $d$ will move into the notches $i$, relieving the doors from the constraint of the bars G, when the pressure of the bale in the press-box will cause them to swing outward, as shown in Fig. 4, when a slight downward pressure will cause it to fall through an open door, B', in the bottom of the press-box. This door is hinged to the bottom of the press-box, below that portion thereof in which a completed bale is situated when ready to be removed, and it is provided with a vibrating latch, $g$, held in place by a staple, $g'$, by means of which the door is held closed when the said latch is engaged with a hook, $h'$, depending from and rigidly secured to the rear end of the press-box, within which is applied a follower, H, having vertical grooves $i'$. G' designates a rack-bar, rigidly secured in any suitable manner to the follower H, and maintained in a horizontal position by means of anti-friction wheels $j$ and $j'$, the former having their bearings in a block, $k$, and the latter in the front end of the press-frame, as shown in Fig. 1; and I designates a pawl-block, having teeth adapted to engage with those of the rack-bar G' when placed in position thereon, and prevented from lateral displacement by means of flanges $l$, (shown in dotted lines, Fig. 1,) which embrace the said rack-bar. The front end of the pawl-block is pivoted to the lower end of an arm, J, the upper end of which is also pivotally secured to a second arm, J', which is in turn pivoted at $m$ to a vertically-vibrating socket, K, having its bearings in standards on the upper rear part of the press-frame. The socket K is adapted to receive one end of a long sweep, L. M designates a second pawl-block, having, like the pawl I, a number of teeth, which are adapted to engage with those of the rack-bar G', and which is pivoted at its rear end to an arm, $o$, hinged to the rear of the press-frame, as shown in Fig. 1. When the power-arm of the lever or sweep L is thrust down the pawl-block I causes the follower to be run up against the mass of cotton in the press-box, the second pawl-block M passing idly over the toothed edge of the rack-bar; but when it is raised with a view to further actuating the follower, the pawl M takes immediate hold of the said bar, and rigidly holds it in the position to which it has been forced until the pawl-block I again actuates the follower. With a view to increasing the rigidity of the arm J', we employ a strong metallic plate, P, pivoted to the arms J and J' at their point of union and to the rear wall of the press-box. By this means any tendency which the said arm might have to lateral displacement at the time of greatest strain during the pressing of a bale is effectually corrected, and all racking of the parts or arms effectually done away with. M' designates a windlass, arranged in suitable bearings at or near the front end of the press-frame, and connected with the follower by means of a cord or chain, $n$. When the bale has been removed from the press-box, a few turns of the windlass will draw the follower to the front end of the press-box, the pawl-blocks I M having been first disengaged from the rack-bar G' by drawing upon cords $x\,x'$ connected thereto, and passing up through the upper surface of the press-box, as shown in Fig. 1.

What we claim as new, and desire to secure by Letters Patent, is—

1. The combination, with the vertically-vibrating hinged doors C C and the sides of the press-box, having hooks $b$, of the transverse bars E, having upon their ends hooked plates $c$, substantially as specified.

2. The combination, with the doors F at the sides of the press-box, having vertical brace-bars $d$, of the bar G, endwise movable in the staples $e$, and having notches $i$, substantially as specified.

3. The combination of the vibrating catch $g$ of the bottom door B' of the press-box with the hook $h'$, substantially as specified.

4. The combination, with the vertically-vibrating socket K and rack-bar G', of the pawl-block I, arms J J', plate P, and pawl-block M, substantially as specified.

In testimony that we claim the above we have hereunto subscribed our names in the presence of two witnesses.

THOMAS B. BENNETT.
EDWIN J. RANCIER.

Witnesses:
HENRY M. FURMAN,
JOS. A. PEDDAMAN.